Aug. 2, 1966 H. KOTT 3,264,545
PLURAL SOURCE CHARGING CIRCUIT FOR RECHARGEABLE FLASHLIGHT
Filed March 23, 1964 2 Sheets-Sheet 1
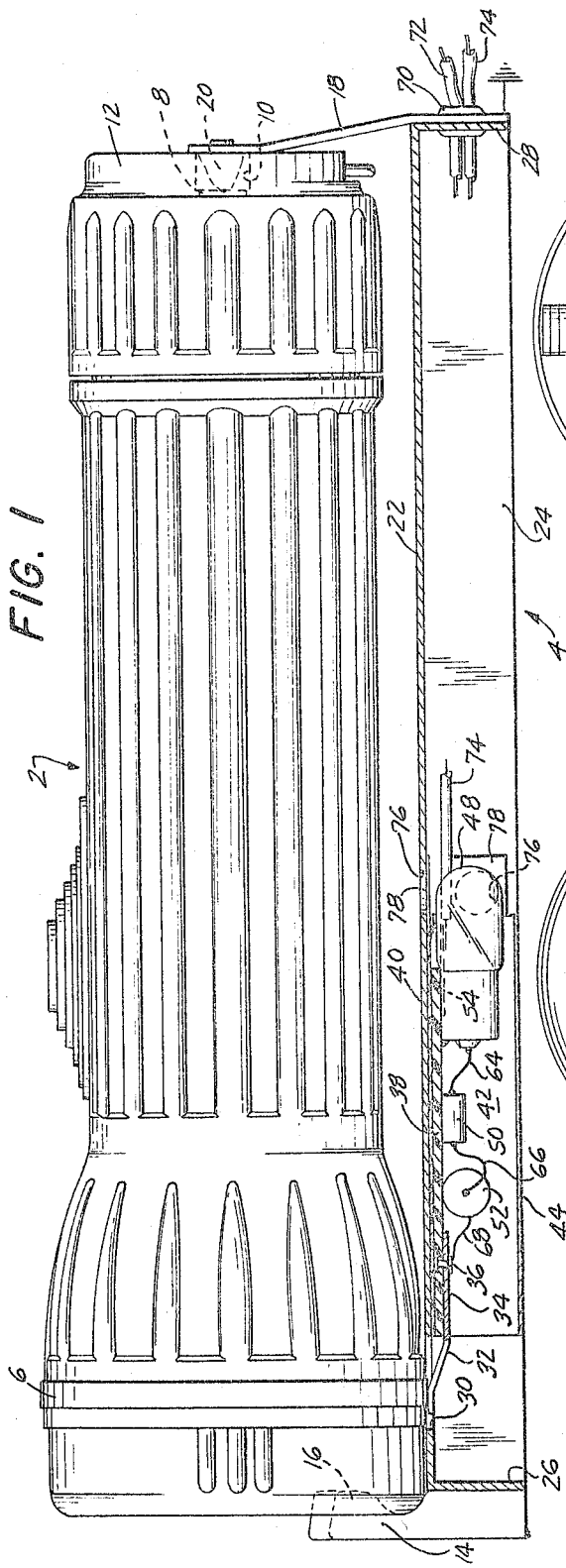
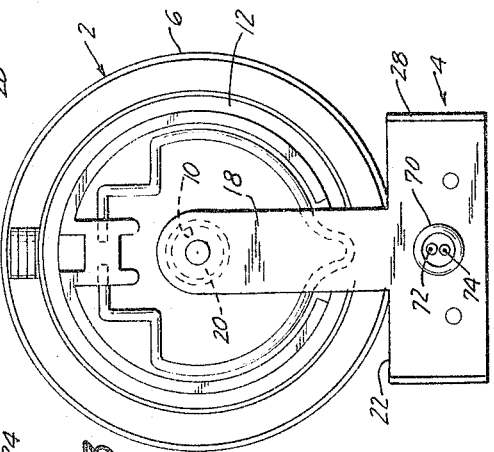
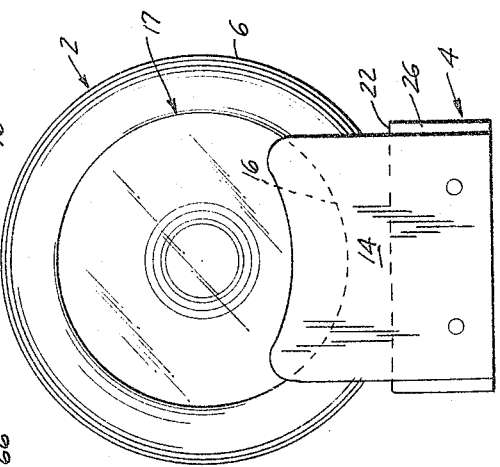
INVENTOR.
HERBERT KOTT
BY
*James and Franklin*
ATTORNEYS

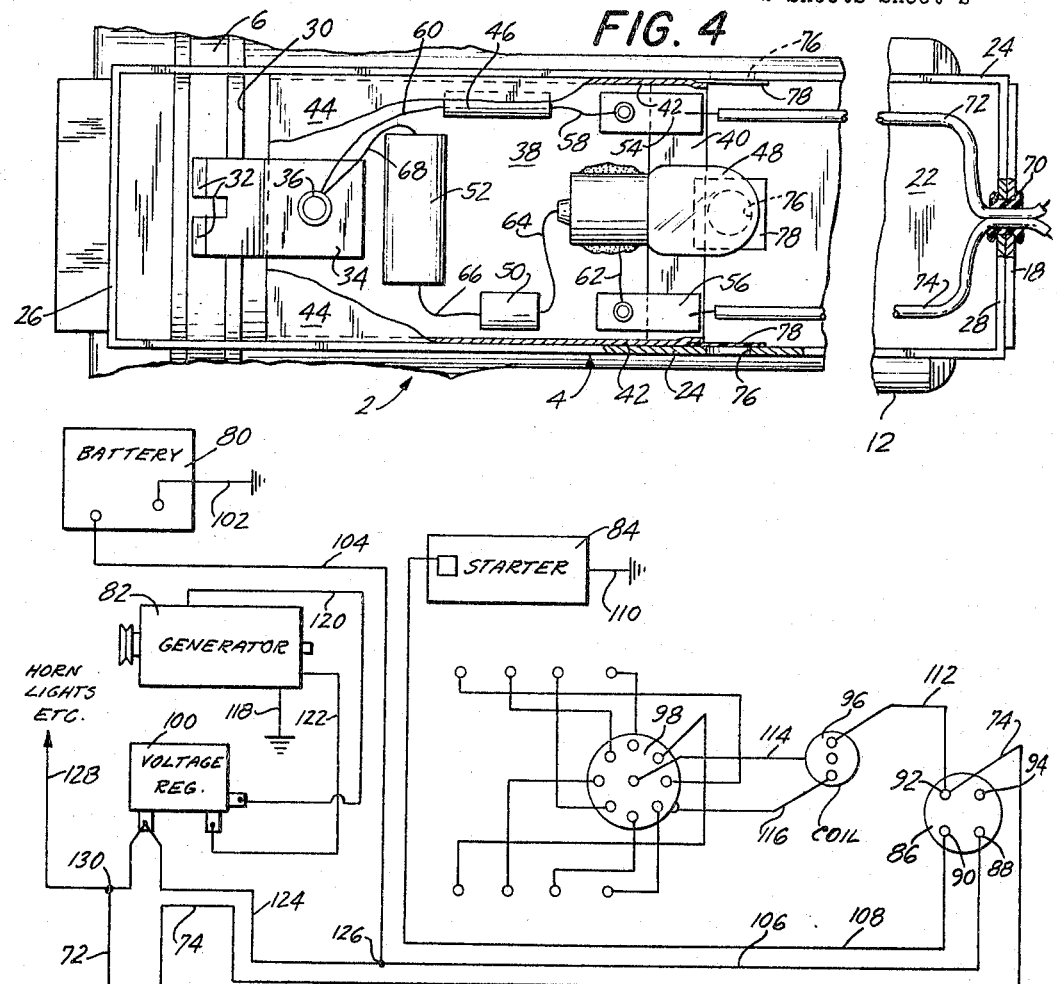

United States Patent Office 3,264,545
Patented August 2, 1966

3,264,545
PLURAL SOURCE CHARGING CIRCUIT FOR RECHARGEABLE FLASHLIGHT
Herbert Kott, River Edge, N.J., assignor to Bright Star Industries, Inc., Clifton, N.J., a corporation of Delaware
Filed Mar. 23, 1964, Ser. No. 353,858
14 Claims. (Cl. 320—22)

The present invention relates to a charging circuit particularly adapted for use with small size storage batteries such as are used in flashlights and the like, the circuit further being specially adapted for use in conjunction with an external electrical system of the type usually associated with a vehicle powered by an internal combustion engine.

Flashlights are stored in vehicles so as to be ready for emergency use. Hopefully a long time elapses between emergencies, and in the interim the flashlight is unused. If the flashlight is not ready for use when it is needed its presence in the vehicle is a trap rather than an aid. Since ordinary dry cell batteries tend to deteriorate with age, it is obviously advantageous to utilize, in conjunction with a vehicle, a flashlight having rechargeable batteries, and to provide such a flashlight, when appropriately mounted in or on the vehicle, with electrical connections to the electrical system of the vehicle so that the flashlight batteries can be charged thereby.

This alone will not, however, provide an optimum degree of security insofar as availability of a flashlight is concerned, because the vehicle is used for only part of the time and may be obliged to stand idle for long periods of time. If charging of the flashlight batteries occurs only during such time as the vehicle is in use, situations may arise where the flashlight will not be adequately charged. If charging of the flashlight batteries is to be effected from the vehicle storage battery, charging taking place when the vehicle is idle as well as when the vehicle is in use, the drain on the vehicle storage battery may be excessive or, if that drawback is avoided, the rate of charging of the flashlight batteries may be insufficient to produce the desired result.

It is a prime object of the present invention to devise a charging circuit for storage batteries, particularly of the type used in flashlights, which avoids the above disadvantages, and which reliably charges the batteries both while the vehicle is idle and while it is in use, without any adverse effect on the electrical system of the vehicle.

The term "vehicle" is here used for purposes of exemplification, since it is in connection with automobiles, boats, aircraft and the like that the utility of the instant invention is most readily apparent, but it should be understood that the term "vehicle" as here used comprehends any other installation provided with two sources of charging current (those two sources in a vehicle being the standard storage battery and the generator driven by the motor) adapted to be selectively operatively connected to the flashlight batteries.

In accordance with the present invention the charging circuit is provided with two branches both of which are adapted to be connected at one end to the flashlight battery to be charged. Each branch includes a resistance, but the magnitudes of the resistances in the two branches differ. One branch, containing a comparatively large magnitude resistance, is adapted to be connected to the storage battery of the vehicle, the value of the resistance being such, in conjunction with the voltage output of the vehicle storage battery, as to provide for a constant trickle charge when the flashlight is connected thereto. The other branch, containing a resistance having considerably smaller magnitude than that in the first mentioned branch, is adapted to be connected to the generator of the vehicle via the ignition switch thereof. The magnitude of the resistance in this latter branch is such, in conjunction with the voltage output of the generator, as to permit the passage therethrough of a substantial charging current. The last mentioned branch is adapted to be connected to the generator of the vehicle when the ignition switch is turned on, as it will be when the motor of the vehicle is running. As a result when the ignition switch is off and the flashlight is electrically connected to the charging circuit the batteries of the flashlight will be constantly charged, but at a slow trickle rate so as not to constitute any significant drain on the storage battery of the vehicle. When the motor of the vehicle is started the flashlight battery will be charged at a rapid rate from the vehicle generator, and since the generator will at the same time be recharging the vehicle storage battery and will have sufficient capacity to perform all of its assigned tasks, the charging of the flashlight batteries will be accomplished rapidly and effectively, and without any deleterious effect on the vehicle electrical system per se.

It is preferred that the charging circuit branch adapted to be connected via the ignition switch to the generator should include a rectifier poled to permit charging current to flow to the flashlight battery but not in the reverse direction, thus making it impossible for the flashlight batteries to discharge through any portion of the electrical system of the vehicle when the ignition switch is off. A pilot bulb may be included in the charging circuit, preferably in the branch thereof connected to the ignition switch, the illumination of the bulb giving a visual signal that flashlight battery charging is taking place and the bulb at the same time constituting a portion of the resistance of the branch circuit in which it is connected.

To the accomplishment of the above, and to such other objects as may hereinafter appear, the present invention relates to the arrangement of a battery charging circuit as defined in the appended claims and as described in this specification, taken together with the accompanying drawings, in which:

FIG. 1 is a side elevational view, partially broken away and cross sectioned, of a rechargeable battery flashlight in position on a holding bracket, elements of the charging circuit being attached to the bracket;

FIG. 2 is an end elevational view taken from the left hand end of FIG. 1;

FIG. 3 is an end elevational view taken from the right hand end of FIG. 1;

FIG. 4 is a bottom plan view, on an enlarged scale, and partially broken away, of the bracket of FIG. 1, showing the circuit elements attached thereto; and FIG. 5 is a diagrammatic view of a typical motor vehicle electrical system with the charging circuit of the present invention incorporated therewith.

A flashlight, generally designated 2 and containing rechargeable batteries, is adapted to be mounted on a bracket generally designated 4. The flashlight 2 is provided with terminals 6 and 8 electrically connected in any apppropriate manner to the rechargeable batteries within the flashlight. The terminal 6 is here disclosed in the form of a conductive band or ring extending around the exterior of the flashlight body, while the terminal 8 is exposed at the inner end of the recess 10 formed in the end cap 12, this arrangement being preferred in order to facilitate the mounting of the flashlight 2 on the bracket 4 and the making of electrical connections to the terminals 6 and 8, while at the same time substantially preventing the possibility of accidental external short circuit between the terminals 6 and 8 while the flashlight 2 is removed from the bracket 4. The flashlight 2 may be held in place on the bracket 4 by means of bracket arm 14 having lip 16 engageable with a matingly shaped lip at the front end of the flashlight body, and by resilient arm 18 mounted at the other end of the bracket 4 and carrying pin 20 which is adapted to enter the recess 10 and engage the terminals 8, the pin 20 and arm 18 being formed of electrically conductive material. This flashlight and bracket construction, and the details thereof, are set forth with more particularity, and various aspects thereof are claimed, in my application entitled "Flashlight with Rechargeable Batteries," Serial No. 353,974, filed of even date herewith and assigned to the assignee of this application.

The bracket 4 may be formed of any suitable structural material, and comprises top wall 22, side walls 24 and front and rear end walls 26 and 28 respectively, the arm 14 being secured to the front wall 26 in any appropriate manner and the arm 18 being secured to the rear wall 28 in any appropriate manner. As indicated, the arm 18 is adapted to be connected to ground, and this may be done either directly or by grounding some portion of the bracket 4 to which the arm 18 is electrically connected.

The top bracket wall 22 is provided with a slot 30 at a location corresponding to the location of the flashlight terminal 6 when the flashlight 2 is in position on the bracket, and spring contact fingers 32 are adapted to extend up through the slot 30 so as to engage the flashlight terminal 6. These fingers 32 extend from conductive body 34 which is secured in any appropriate manner, as by eyelet 36, to insulating plate 38. This plate is mounted on the underside of the top bracket wall 22 in any desired manner, being insulated therefrom by means of insulating sheet 40 interposed between the wall 22 and the eyelet 36 and plate 38. The sheet 40 may be provided with integral side portions 42 extending down along the inner surfaces of the side bracket walls 24, and by wall portion 44 adapted to extend beneath and vertically spaced from the plate 38, thereby to provide protection for the other elements mounted on the plate 38.

Those circuit elements, as may best be seen in FIGS. 4 and 5, comprise resistor 46, bulb 48, rectifier 50 and resistor 52, as well as connection tabs 54 and 56. Leads 58 and 60 connect the resistor 46 between terminal tab 54 and conductive body 34, thereby defining, in part, one branch of the charging circuit. The other branch of the charging circuit is defined by connection tab 56, bulb 48, rectifier 50 and resistor 52, connected in series with one another and to the conductive body 34 by leads 62, 64, 66 and 68.

An insulating bushing 70 passes through the rear bracket wall 28 and the lower portion of the arm 18, and a pair of leads 72 and 74 extend through the bushing 70, the lead 72 being connected in any appropriate manner to the connection tab 54 and the lead 74 being conected to the connection tab 56. The bulb 48 is located adjacent to one or more openings 76 in appropriate walls of the bracket, which openings may be covered with light-transmissive sheets 78 of appropriate colored material, so that illumination of the bulb 48 may be observed from the exterior of the bracket 4.

Turning now to FIG. 5, a typical automotive vehicle electrical system is there disclosed. That system comprises a storage battery 80, a motor driven generator 82, a motor starter 84, an ignition switch 86 having terminals 88, 90, 92 and 94, an ignition coil 96, a distributor 98 and a voltage regulator 100. One terminal of the battery 80 is connected to ground by lead 102. The other battery terminal is connected by leads 104 and 106 to switch terminal 88. Lead 108 connects switch terminal 90 to one terminal of the starter 84, the other starter terminal being connected by lead 110 to ground. Lead 112 connects switch terminal 92 to distributor coil 96, which is in turn connected to the distributor 98 via leads 114 and 116. One terminal of the generator 82 is connected to ground vial lead 118 and leads 120 and 122 connect the other side of the generator output to one side of voltage regulator 100. Lead 124 connects the other side of the voltage regulator 100 to point 126 at the junction of leads 104 and 106, thereby connecting the voltage regulator output to the battery 80 and to the ignition switch 86 respectively. Lead 128 is connected to lead 124 and extends to various vehicle accessories such as lights, horn, etc. Lead 72 of the flashlight battery charging circuit is connected to point 130 on lead 128, and therefore is connected to output of the voltage regulator 100. Lead 74 of the flashlight battery charging circuit is connected to terminal 92 of the ignition switch 86. When the ignition switch is off the terminal 88 thereof is connected only to blind terminal 94. When the ignition switch 86 is turned to starting position terminal 88 will be connected to terminals 90 and 92, thus energizing the starter 84 and supplying electrical energy to the distributor 98. After the motor has started the ignition switch is turned on "on" position, in which the terminal 88 is connected only to terminal 92, thus deenergizing the starting motor 84, but permitting electrical energy to be supplied to the distributor 98 from the generator 82, the latter now being driven by the motor.

From FIG. 5 it will be seen that when the ignition switch 86 is off the battery 80 is connected to the spring fingers 32, and through them to flashlight charging terminal 6, via leads 104, 124, 128 and 72 and resistance 46. The magnitude of resistance 46 is comparatively high, and is such as to permit the passage therethrough of only a small or "trickle" charging current, such as 8 milliamperes even when the vehicle storage battery 80 is at full rated voltage output. Thus the batteries in the flashlight 2 will be charged even though the vehicle is inactive and the ignition switch 86 is off, yet that charging will occur at such a low rate as not to represent any appreciable drain on the vehicle storage battery 80.

When the ignition switch 86 is "on" the output of the generator 82 will be connected to lead 74 via voltage regulator 100, leads 124 and 106 and terminals 88 and 92 of the ignition switch 86. Hence the generator output will pass through bulb 48, rectifier 50 and resistor 52 in order to reach spring contacts 32 and the charging terminal 6 of the flashlight 2. The overall resistance of this branch of the charging circuit, which includes the resistance of the bulb 48 and the resistance 52, will have a magnitude considerably less than that of the resistance 46 in the other branch of the charging circuit, so that a charging current will flow therethrough much greater than the trickle charge which flowed through the resistance 46 when only the battery was connected thereto. Purely by way of example, a charging current on the order of 100 milliamperes could be permitted through the charging circuit branch of which bulb 48 and resistance 42 form a part when the output of the generator 82 is at rated voltage. Thus when the motor is running and the generator 82 is functioning, the batteries in the flashlight 2 will become charged at a relatively rapid rate. While the charging circuit branch of which the resistance 46 is a part is still in the circuit when the ignition switch 86 is on, being connected therein in parallel with the branch containing the bulb 48 and resistor 52, its resistance will be so much greater than that of the latter branch as to play no appreciable part in the charging of the flashlight batteries. By way of exemplification, resistance 46 may have a value of 1500 ohms, resistance 42 may have a value of 100 ohms, and bulb 48, when lit, may have a resistance of 32 ohms.

It will be noted that lead 74 is connected to lead 112 at ignition switch terminal 92. Hence a discharge path is provided for the flashlight batteries, and this entirely independently of the condition of the ignition switch 86. In order to prevent the flashlight batteries from discharging through that path, the rectifier 50 is placed in series with the bulb 48 and resistor 42, that rectifier 50 being poled to permit charging current to flow to the spring contacts 32 but not permitting current to flow in the opposite direction.

Through the use of the dual branch charging circuit here disclosed, connected as indicated to two separate sources of charging current, such as the vehicle storage battery 80 and the vehicle motor-driven generator 82, charging of the batteries of the flashlight 2 is ensured whenever that flashlight is electrically connected to the charging circuit, that charging continuing at a slow rate such as not to constitute any significant drain on the first charging current source such as the vehicle storage battery 80, the charging taking place at a more rapid rate when the renewable charging current source such as the motor driven generator 82 is operative. In the motor vehicle electrical system in conjunction with which the invention is here specifically illustrated, the ignition switch 86 which, in effect, controls the actuation and deactuation of the generator 82, also serves, without any additional manipulation, to control the electrical connections between the branches of the charging circuit and their respective charging current sources so as to give rise to that charging rate compatible with the status of the external system. The bulb 48 not only functions as a resistance in the charging circuit branch in which it is included, but also serves to visually indicate whether or not flashlight battery charging is taking place, thus indicating the operativeness of the high rate charging circuit branch and also indicating whether the flashlight 2 is properly mounted on the bracket 4 so as to be electrically connected with the charging circuit.

While but a single embodiment of the present invention has been here disclosed, and while that disclosure has been in connection with an external electrical system such as is commonly employed in a vehicle such as an automobile, it will be apparent that many variations may be made, both in the design of the charging circuit and in the design of the external circuitry in conjunction with which it is used, without departing from the spirit of the invention as defined in the following claims.

I claim:

1. In combination with an electrical system comprising a source battery, a generator, a utilization device, an electrical connection between said battery and said generator, and an electrical connection between said generator and said utilization device including a switch; a charging circuit for a second battery comprising first and second charging circuit branches each adapted to be connected at one end to a second battery, said first branch comprising a first resistance, said second branch comprising a second resistance the magnitude of which is many times smaller than that of said first resistance, the other end of said first branch being connected to said source battery independently of said switch, the other end of said second branch being connected to said switch, said switch connecting said second branch to and disconnecting said second branch from said generator when said switch respectively connects and disconnects said utilization device relative to said generator.

2. The combination of claim 1, in which the magnitude of said first resistance is such as, in combination with the voltage output of said source battery, to permit a first charging current of predetermined magnitude to flow therethrough, the magnitude of said second resistor being such as, in combination with the voltage output of said generator, to permit a second charging current to flow therethrough of magnitude many times greater than that of said first charging current.

3. The combination of claim 2, in which said first charging current is a trickle charge.

4. The combination of claim 2, in which the magnitude of said first charging current is on the order of 8 milliamperes and the magnitude of said second charging current is on the order of 100 milliamperes.

5. In combination with an electrical system comprising a source battery, a generator, a utilization device, an electrical connection between said battery and said generator, and an electrical connection between said generator and said utilization device including a switch; a charging circuit for a second battery comprising first and second charging circuit branches each adapted to be connected at one end to a second battery, said first branch comprising a first resistance, said second branch comprising a second resistance the magnitude of which is many times smaller than that of said first resistance in series with a rectifier poled to permit charging current to reach said second battery and to prevent current from flowing in the opposite direction, the other end of said first branch being connected to said source battery independently of said switch, the other end of said second branch being connected to said switch, said switch connecting said second branch to and disconnecting said second branch from said generator when said switch respectively connects and disconnects said utilization device relative to said generator.

6. The combination of claim 5, in which the magnitude of said first resistance is such as, in combination with the voltage output of said source battery, to permit a first charging current of predetermined magnitude to flow therethrough, the magnitude of said second resistor being such as, in combination with the voltage output of said generator, to permit a second charging current to flow therethrough of magnitude many times greater than that of said first charging current.

7. The combination of claim 6, in which said first charging current is a trickle charge.

8. The combination of claim 6, in which the magnitude of said first charging current is on the order of 8 milliamperes and the magnitude of said second charging current is on the order of 100 milliamperes.

9. In combination with an electrical system comprising a first charging current source, a second charging current source, a utilization device, and an electrical connection between said second charging current source and said utilization device including a switch; a charging circuit for a battery comprising first and second charging circuit branches each adapted to be connected at one end to a battery, said first branch comprising a first resistance, said second branch comprising a second resistance having a magnitude many times smaller than that of said first resistance, the other end of said first branch being connected to said first source of charging current independently of said switch, the other end of said second branch being connected to said switch, said switch connecting said second branch to and disconnecting said second branch from said second charging current source when said switch respectively connects and disconnects said utilization device relative thereto.

10. The combination of claim 9, in which the magnitude of said first resistance is such as, in combination with the voltage output of said first charging current source, to permit a first charging current of predetermined magnitude to flow therethrough, the magnitude of said second resistance being such as, in combination with the voltage output of said second charging current source, to permit a second charging current to flow therethrough of magnitude many times greater than that of said first charging current.

11. The combination of claim 10, in which said first charging current is a trickle charge.

12. In combination with an electrical system comprising a first charging current source, a second charging current source, a utilization device, and an electrical connection between said second charging current source and said utilization device including a switch; a charging circuit for a battery comprising first and second charging circuit branches each adapted to be connected at one end to a battery, said first branch comprising a first resistance, said second branch comprising a second resistance having a magnitude many times smaller than that of said first resistance in series with a rectifier poled to permit charging current to reach said battery and to prevent current from flowing in the opposite direction, the other end of said first branch being connected to said first source of charging current independently of said switch, the other end of said second branch being connected to said switch, said switch connecting said second branch to and disconnecting said second branch from said second charging current source when said switch respectively connects and disconnects said utilization device relative thereto.

13. The combination of claim 12, in which the magnitude of said first resistance is such as, in combination with the voltage output of said first charging current source, to permit a first charging current of predetermined magnitude to flow therethrough, the magnitude of said second resistance being such as, in combination with the voltage output of said second charging current source, to permit a second charging current to flow therethrough of magnitude many times greater than that of said first charging current.

14. The combination of claim 13, in which said first charging current is a trickle charge.

No references cited.

JOHN F. COUCH, *Primary Examiner.*

S. WEINBERG, *Asisstant Examiner.*